(12) United States Patent
Burnett

(10) Patent No.: US 6,597,653 B1
(45) Date of Patent: Jul. 22, 2003

(54) INTERACTIVE TRANSACTION CARD

(75) Inventor: Robert C. Burnett, 7762 Sunnyview Ct., Ft. Worth, TX (US) 76137

(73) Assignee: Robert C. Burnett, Fort Worth, TX (US)

(*) Notice: Subject to any disclaimer, the term of this patent is extended or adjusted under 35 U.S.C. 154(b) by 0 days.

(21) Appl. No.: 09/452,335

(22) Filed: Nov. 30, 1999

Related U.S. Application Data

(60) Provisional application No. 60/148,557, filed on Aug. 12, 1999.

(51) Int. Cl.[7] ............................................... G11B 5/84
(52) U.S. Cl. ....................................................... 369/273
(58) Field of Search ................ 369/273, 270, 369/272, 280, 77.1; 705/59

(56) References Cited

U.S. PATENT DOCUMENTS

| | | | | |
|---|---|---|---|---|
| 5,982,736 A | * | 11/1999 | Pierson ........................ | 369/273 |
| 6,078,557 A | * | 6/2000 | Pierson ........................ | 369/273 |
| 6,381,588 B2 | * | 4/2002 | Oshima et al. ............... | 705/59 |

FOREIGN PATENT DOCUMENTS

| | | | |
|---|---|---|---|
| EP | 04040586 | * | 10/1992 |
| GB | 2239974 | * | 7/1991 |

* cited by examiner

*Primary Examiner*—Allen Cao

(57) ABSTRACT

The present invention is an interactive transaction card having an optical disk which is readable by a CD ROM drive. A coded strip, such as a magnetic strip, is disposed on one side of the optical disk. The magnetic strip has an identification code, such as an account number, which identifies a user's credit or debit account. The optical disk is further configured so that by inserting it into a magnetic card reader, the reader is able to derive the identification information for a transaction. The same identification code may also be stored on the optical disk to allow the CD ROM drive to read and utilize the identification information. The optical disk may contain multimedia modules including various audio, moving or still pictures, graphics, and video files. The optical disk may also contain additional modules programmed to connect to the Internet to facilitate electronic commerce or to provide additional information on a web site. Thus, the transaction card provides the convenience of a conventional credit and debit card with added benefits of multimedia presentations and Internet connectivity. The interactive transaction card combines the advantages of two computer mediums to provide a card with magnetic strip technology and high capacity storage.

31 Claims, 3 Drawing Sheets

INTERACTIVE TRANSACTION CARD

RELATED APPLICATIONS

This application claims priority to United States Provisional Patent Application Ser. No. 60/148,557, filed Aug. 12, 1999.

BACKGROUND OF THE INVENTION

1. Field of the Invention

The present invention relates to the fields of credit and debit cards and computer storage mediums.

2. Relevant Technology

Magnetic strip cards are well known and in wide use for transactions relating to credit and debit accounts. A magnetic strip card is embodied as a plastic card having a magnetic strip comprising a magnetically sensitive material. The magnetic strip is oriented through conventional magnetic technology to store a user's account number corresponding to a user's credit or debit account. During read operations, the magnetic strip card is "swiped" through a reader having a magnetic head that senses the magnetic polarities encoded on the magnetic strip to thereby derive the account number. A merchant may then debit or credit the appropriate account based on the account number. The simple and efficient operation of the magnetic strip cards have made them extremely popular and an integrated part of modern day commerce.

Another popular computer readable storage medium is the optical disk which can store large volumes of high density information. The optical disk operates by storing information on a disk in the form of lands and pits. Data stored on the optical disk is typically configured in a single track that spirals from the center of the disk to the disk's circumference. An optical disk drive generates a tightly focused laser beam to strike the lands and pits on the surface of the disk. Light that strikes a pit is scattered and light that strikes a land is reflected directly back at a detector. By reading the lands and pits, the detector generates electrical voltages which are matched against a timing circuit to generate a binary stream. The binary stream is in turn read by a computer. The optical disk may be embodied in various forms including erasable optical disks, WORMS (write once, read many), and DVD.

A convenient aspect of the magnetic strip card and the optical disk is that both are portable hand-held computer readable mediums that may be carried to electronic read devices at various locations. Read devices are only able to read corresponding optical disks or magnetic strip cards for which they are specifically designed. It is common practice to carry magnetic strip cards for everyday commerce and personal identification. Thus, consumers are well accustomed to their use.

In the ever growing world of electronic commerce there are advanced advertising, marketing, and transaction applications which sponsors may wish to incorporate into a transaction card. Such applications require large storage capacities and would clearly exceed the storage of a magnetic strip card. Optical disks are optimal at providing high capacity storage for multimedia data and other high end applications. Optical disks may further be shaped and sized to allow them to be carried in a purse or wallet. Thus, it would be an advancement in the art of commerce and personal identification to have a computer readable transaction card combining the features of the magnetic strip card with the comparable extensive memory capability of an optical disk. Such a device is disclosed and claimed herein.

SUMMARY OF THE INVENTION

The interactive transaction card of the present invention comprises an optical disk which is readable by a computer's CD ROM drive. The transaction card further has a magnetic strip disposed on a surface of the optical disk. The magnetic strip has an identification code, such as an account number, which in today's business transactions identifies a user's credit or debit account. The proposed optical disk is configured to be insertable into a magnetic card reader. The magnetic card reader, as always, reads the magnetic polarities of the magnetic strip to derive the expected identification code as required to complete a transaction. To enable e-commerce via the computer, the identification code may also be stored on the optical disk to allow the CD ROM drive to read and transport code.

The optical disk may contain multimedia modules including various audio, still or motion pictures, graphics, and video files. Some of the modules are interactive to the user and some are interactive with a computer. This allows a user the convenience of having a conventional credit and debit card with the added benefits of multimedia presentations and interactivity. Thus, a user may receive promotional and instructional material on the interactive transaction card. The optical disk may further include a module programmed to provide an automatic Internet connection where commerce can be simplified through the availability of the identification module. A card's Internet browser may be directed to display the web site of the transaction card issuer, associated merchant, or other advertiser. The user may then transact on this web site, other sites, or receive additional promotional or instructional information.

The interactive transaction card combines the advantages of two computer mediums to provide a card with (1) magnetic strip technology and (2) high capacity storage for additional commercial features. These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of invention are obtained, a more particular description of the invention summarized above will be rendered by reference to the appended drawings. Understanding that these drawings only provide selected embodiments of the invention and are not therefore to be considered limiting of the scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the FIGS.

1–6 wherein like parts are designated by like numerals throughout. It will be readily understood that the components of the present invention, as generally described and illustrated in the Figures herein, could be arranged and designed in a wide variety of different configurations. Thus, the following more detailed description of the embodiments of the apparatus, system, and method of the present invention, as represented in FIGS. 1 through 6 is not intended to limit the scope of the invention, as claimed, but is merely representative of presently preferred embodiments of the invention.

Figure 1:
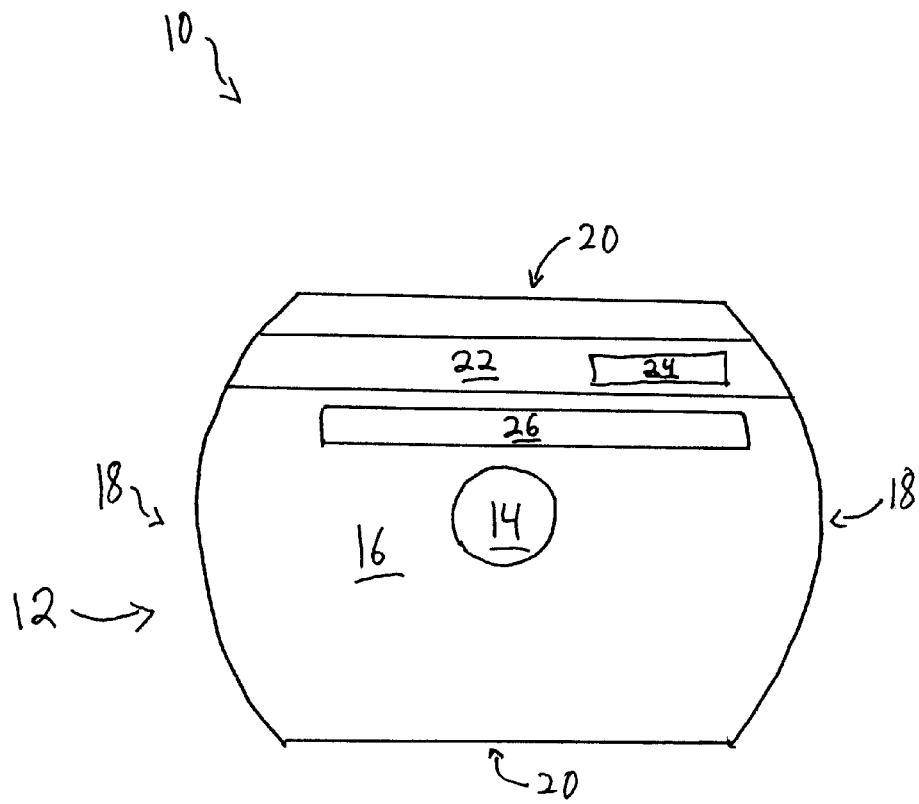
FIG. 1 is a plan view of one embodiment of a transaction card.

Referring to FIG. 1, the transaction card of the present invention is shown and generally designated 10. The transaction card 10 comprises an optical disk 12 such as a compact disk (CD), WORM, erasable optical disk, or a DVD. The optical disk 12 comprises a sprocket hole 14 to accommodate engagement with a CD ROM drive to allow rotation of the optical disk 12. In one embodiment, the optical disk 12 may be configured with a read side (not shown in FIG. 1) which has a reflective layer for reading of the optical disk 12 and a non-read side or visual display side 16 upon which a label may be attached. The optical disk 12 is configured as is well known in the art to be suitable for engagement with a drive. In any of the suitably known configurations the optical disk's 12 shape inherently positions the optical disk 12 properly in a drive.

Standard diameters for optical disks are 120 and 80 mm. Optical disks 12 which are approximately 80 mm in diameter are one presently preferred embodiment as they are accepted in most CD ROM drives. Furthermore, the 80 mm diameter length is a suitable length for a transaction card which usually is expected to be convenient to carry in the palm of user's hand as well as in a wallet or purse.

In the embodiment shown in FIG. 1, the optical disk 12 has a hybrid shape in that it has opposing ends 18 which are radial and opposing width ends 20 which are chords in configuration. One of skill in the art will appreciate that the present invention is not limited to the shape shown in FIG. 1. The opposing ends 18 have diameters, such as 80 mm, which allows the optical disk 12 to nest in a CD ROM drive. The width ends 20 provide a shape which more closely approximates a conventional magnetic transaction card and facilitates insertion of the card into magnetic read devices and into a purse or wallet. The width of the optical disk 12, defined as the distance between the two width ends 20 approximates the width of a conventional transaction card. In one embodiment, this width may be 55 mm. Thus embodied, the optical disk 12 is of a shape and size for insertion in CD ROM drives, magnetic read devices, and purses or wallets.

The optical disk 12 has information stored thereon which is referenced herein as modules. Modules may include any type of computer instruction or computer executable code located within a memory device and/or transmitted as electronic signals over a system bus or network. Some of these modules may interact with other modules stored on the interactive transaction card 10. An identified module may, for instance, comprise one or more physical or logical blocks of computer instructions, which may be organized as an object, procedure, function, or the like. The modules may further include operational data, extensive personal data for identification or qualification, and multimedia applications such as text, audio, video and so forth.

In one embodiment, the transaction card 10 further comprises a magnetic strip 22 which is disposed on one surface of the optical disk 10. In one embodiment, the magnetic strip 22 is disposed on the non-read side 16 or visual display side of the optical disk 12. The non-read side 16 may also be referenced as an identifying, logo, or graphics side of the transaction card 10. This is in contrast to magnetic strip cards which typically place the magnetic strip on the surface opposite the identifying or advertising display surface. Alternatively, the magnetic strip 22 may be disposed on the read side but located on the optical disk 12 so as not to interfere with a drive's reading of the optical disk 12. The magnetic strip 22 may be configured in a generally linear and rectangular shape as is well known in the art. In one embodiment, the magnetic strip 22 is disposed parallel to the length of the optical disk 12 and has a width of about, but not limited to, 5/16 inches.

The magnetic strip 22 has magnetically encoded thereon an identification code 24. The identification code may comprise numbers which represent a credit or debit account or other designation as is standard in the industry. The magnetic strip 22 may be read by a magnetic reader to allow the transaction card 10 to function as a conventional credit or debit card or personal identification card.

As with conventional magnetic strip cards, the transaction card 10 may further be embodied with a signature box 26 as is usually embodied on a traditional credit card. The signature box 26 may be disposed parallel to the magnetic strip 22 on the read side. An account number may also be printed on the read or non-read side 16 of the transaction card 10 as with conventional magnetic strip cards. This would allow manual reading or manual entry of an account number by a merchant for crediting or debiting of the account.

Figure 2:
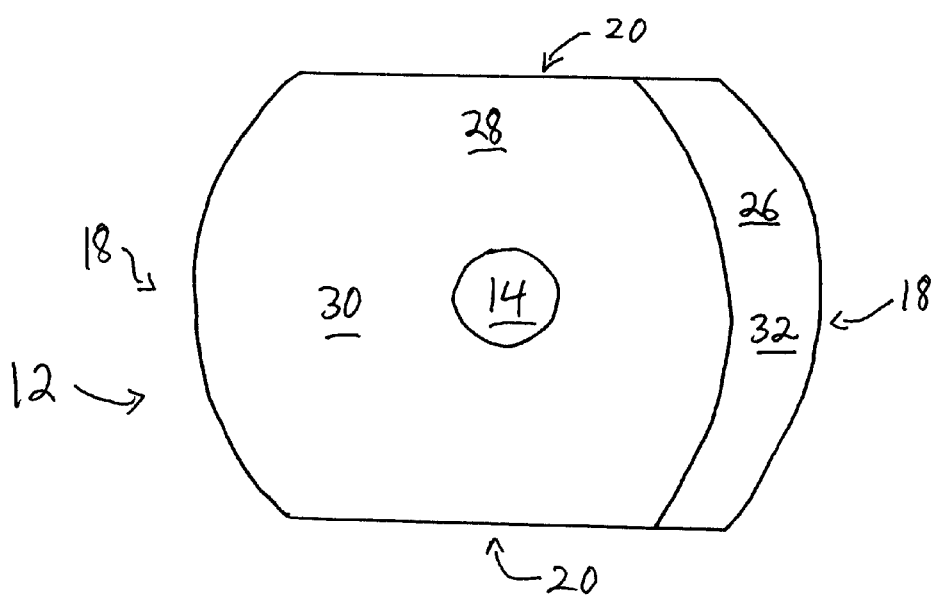
FIG. 2 is a plan view of an alternative embodiment of the transaction card.

Referring to FIG. 2, an alternative embodiment of the transaction card 10 is shown. The read side 28 is shown and is configured with a read area 30 and a non-read area 32. The read area 30 enables reading by an optical device. The non-read area 32 may be an etched area and provides a user with a signature signing area such as a signature box 26. The signature box 26 may be located in alternative positions or eliminated entirely.

The optical disk 12 portion of the transaction card 10 is constructed with a thickness and shape which enables it to function as a traditional credit card in a standard magnetic card reader through the identifying feature of the attached magnetic strip 22. The thickness of the optical disk is manufactured to be suitable for use with conventional CD ROM drives and conventional magnetic strip readers.

Figure 3:
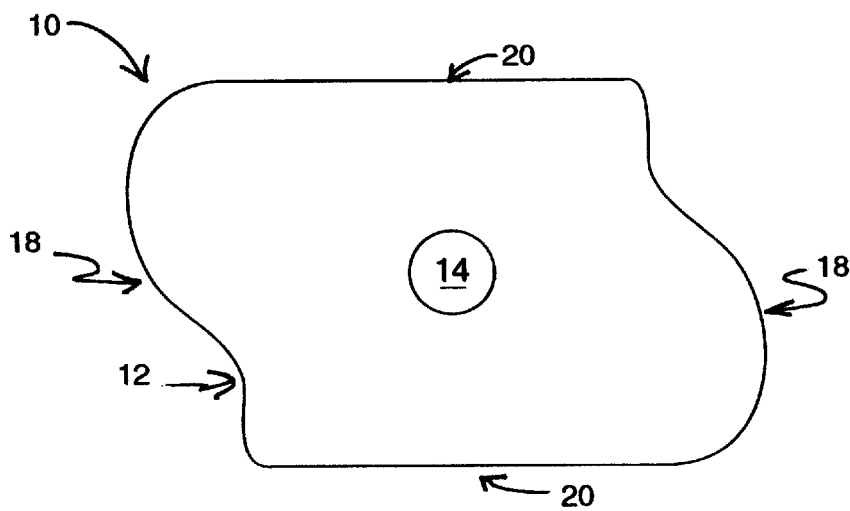
FIG. 3 is a plan view of another alternative embodiment of the transaction card.
Figure 4:
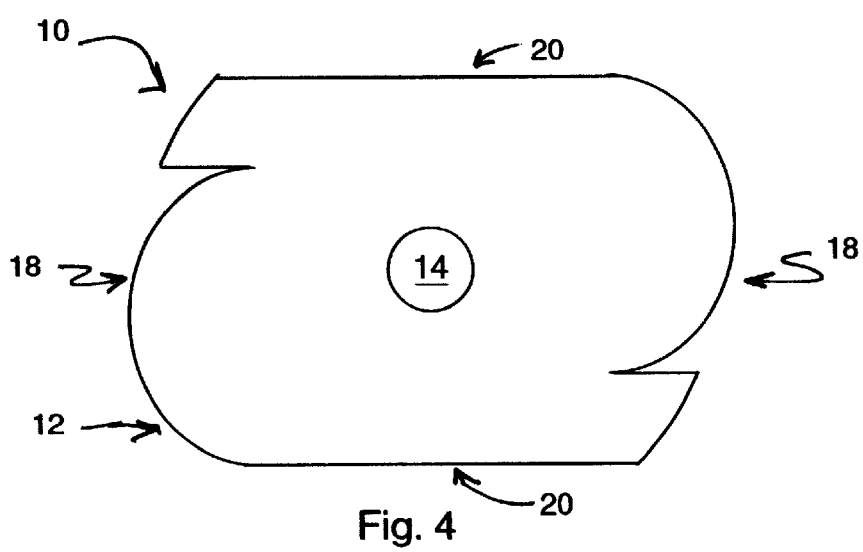
FIG. 4 is a plan view of another alternative embodiment of the transaction card.
Figure 5:
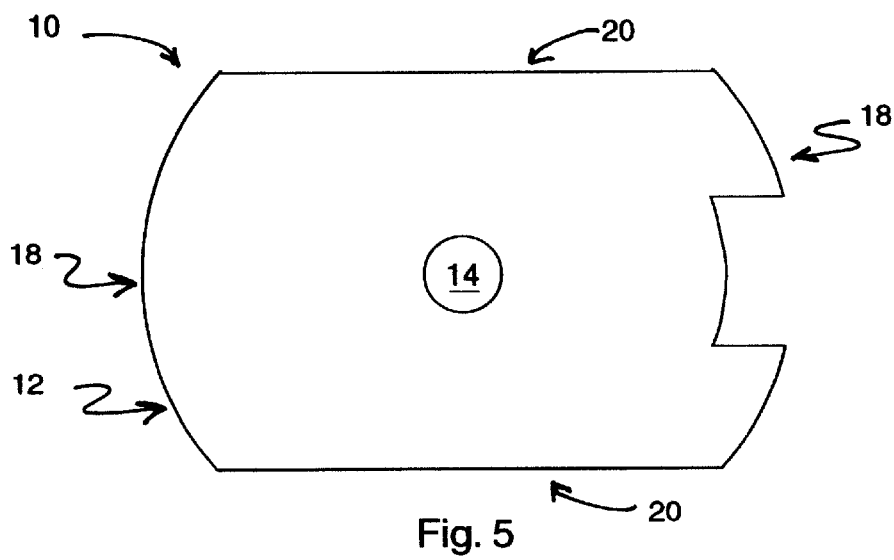
FIG. 5 is a plan view of another alternative embodiment of the transaction card.

The optical disk 12 may be embodied in various shapes for aesthetic features so long as it remains compatible for use with CD ROM drives. With reference to FIGS. 3–5 only a few, possible alternative shapes for the optical disk 12 of the present invention are shown.

Combining the traditional magnetic strip and optical disk technologies together into one transaction card 10 presents new opportunities for electronic commerce and extensive personal identification, and promotional and advertising venues. An issuer of the transaction card 10 may code the optical disk 12 with any number of information messages some of which are interactive with the user for play on a computer. An optical disk 12, such as a CD ROM, can presently store thousands of times the amount of information that a magnetic strip can store. This vast amount of storage allows the optical disk 12 portion of the transaction card 10 to contain extensive personal identification material as well as media features including advertising and educational messages through pictures, audio, and film clips. The transaction card may also include a digitized photograph of the user. In this manner, a user may receive advertising promotional material, commercials, special offers, as well as the issuer's message or a message paid for by one or more venders. The invention may therefore serve to replace printed catalogs with interactive catalogs. At the same time, the magnetic strip 22 portion provides an identification of a user's account or other personal information relating to the user for operation as a credit, debit, or personal qualifying card.

Figure 6:
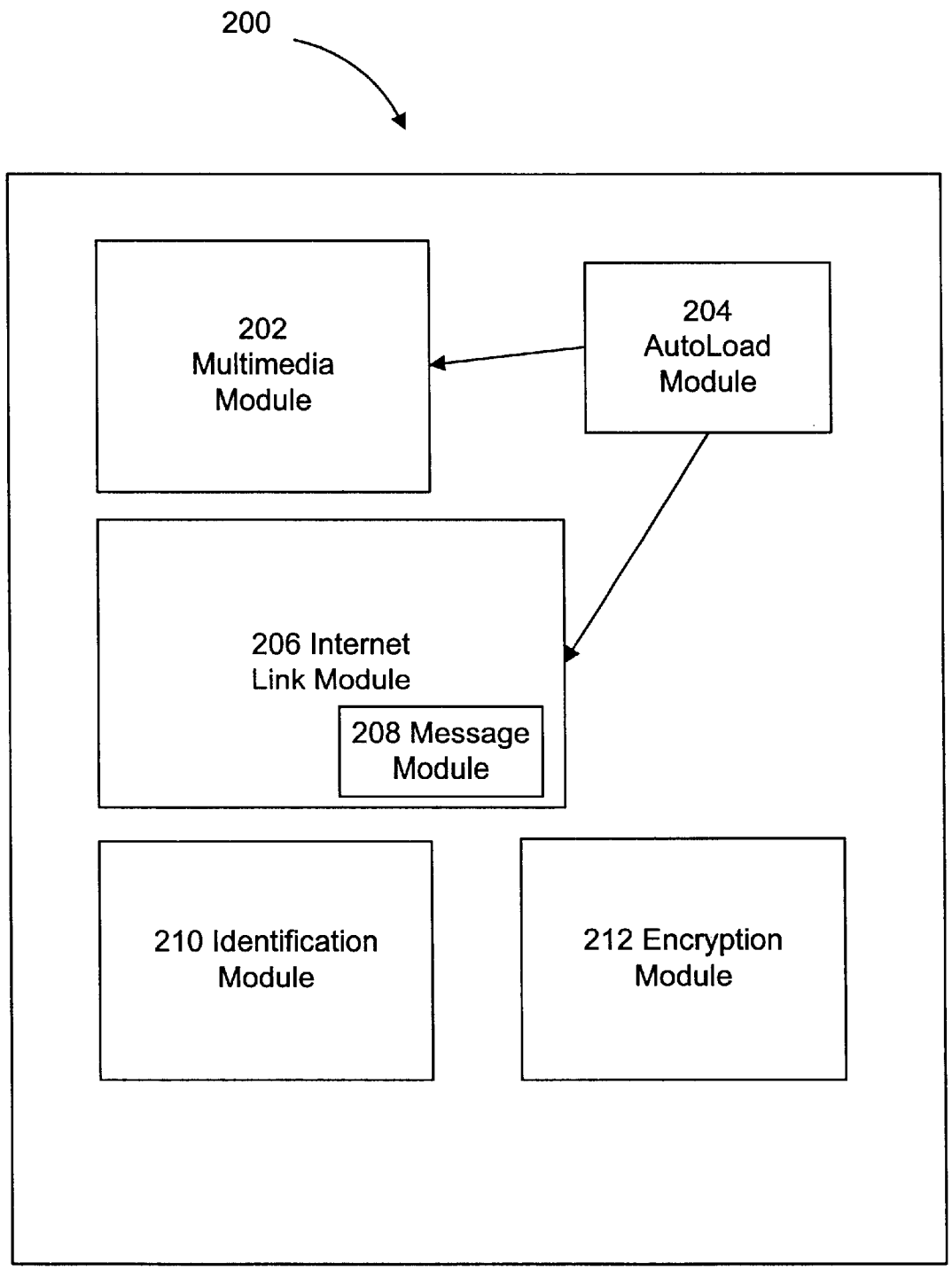
FIG. 6 is a block diagram of software modules which may be stored on the transaction card.

Referring to FIG. 6, a block diagram of modules 200 which may be stored on the optical disk 12 is shown. Modules 200 stored on the optical disk 12 may be allocated to one or more advertisers or merchants. Advertisers or merchants may be charged different rates depending on the positions of their respective modules 200 stored on the optical disk 12. For example, a module 200 which is loaded first is a more prominent position as it is more likely to be viewed or executed. The more prominent positions may be charged a higher rate than other positions on the optical disk 12. Advertisers or merchants may further be charged different rates based on the order that their websites are displayed when their transaction card 10 executes a connection to the Internet. In one embodiment, the card user will be able to control the order influence of these positions at any time. For example, a user would not be required to view more prominently placed advertisements prior to arriving at a desired message.

The modules 200 may include multimedia modules 202 including various audio, pictures, graphics, and video files. An auto-load module 204 may further be stored on the optical disk 12. The auto-load module 204 enables auto-loading of one or more modules stored on the optical disk 12. The auto-load module 204 may also load a connection to the Internet in the background when the optical disk 12 is inserted into a CD ROM drive.

In addition to providing multimedia to a user, the optical disk 12 may further include an Internet link module 206 configured to provide a link to the Internet. The Internet link module 206 may be enabled automatically by the auto-load module 204 to load the Internet in the background while the transaction card 10 presents a multimedia application. Thus, upon insertion of the optical disk 12 into the CD ROM drive, a connection is established to the Internet. Ideally, a computer's browser is then directed to display the web site of the transaction card's 10 issuer, associated merchant, or other advertiser.

The Internet link module 206 may also be configured to engage the browser operations on a computer to drive an Internet presentation. The Internet link module 206 may be configured to enable its own browser and establish its own connection to the Internet independent of other browser software on a computer. The Internet link module 206 could thus function as its own "portal" to the Internet. In this manner, an Internet connection may be enabled if the appropriate computer equipment exists. The computer may be instructed by the Internet link module 206 to log onto a designated server which would provide the Internet connection. This Internet connection may be performed as an advertising or instructional service with little or no additional cost to the user. The Internet link module 206 may further be configured to limit the web sites available for viewing. For example, a user may only be able to view the web sites for sponsors associated with the transaction card 10.

The Internet link module 206 may include a message module 208 configured to send a message to a web site to identify the user and the transaction card 10. The message may include the user's identification or account number or other confidential information to accomplish an electronic transaction. The message module 208 may be configured to transmit the message in an encrypted format.

One or more of the modules 200 may be stored in an encrypted format on the optical disk 12. The modules 200 may also include an encryption module 212 for encrypting data such as one or more modules stored on the optical disk 12. A module 200 may therefore be transmitted in an encrypted format to ensure confidentiality. Thus, confidential or otherwise personal information on the optical disk 12 may be protected using standard encryption technology.

An identification module 210 may also be stored on the optical disk 12. The identification module 210 may contain information specific to a user. In one embodiment, the identification module 210 may contain the identification code 24. The identification module 210 may be read by a CD ROM drive to retrieve the identification code 24 or other user information. The high storage capacity of the optical disk 12, allows the identification module 210 to contain thousands of times more extensive user information than the magnetic strip. For example, the identification module 210 may contain a user's complete credit history, medical history, transaction history, bank or financial account history, driving history and so forth. Thus, the information stored on the identification module 210 need not be limited to credit or debit concerns exclusively.

The identification module 210 may further contain multiple identification codes 24 specific to various entities, sponsors, etc. Thus, the memory capacity of the optical disk 12 allows for numerous interactive uses. The card 10 may replace several conventional transaction cards by incorporating all of their features and accounts into the card 10 by virtue of the memory capacity of the optical disk 12. Thus, the need for carrying multiple credit cards is eliminated. For security, identification codes 24 may be encrypted and would only be accessed by related and authorized entities with proper encryption. Thus, an entity will only be able to access an identification code 24 specific to their organization and will be unable to access non-related identification codes 24.

The memory capacity of the optical disk 12 further allows for redundant storage of one or more identification codes 24. If a portion of the optical disk 12 is damaged, the redundant storage of identification codes 24 increases the likelihood of being able to read the identification code 24 from an undamaged portion of the optical disk 12.

After retrieving the user information, such as an identification code 24, from the optical disk 12, the message module 208 transmits the user information on line through the Internet for electronic commerce. The user information may be encrypted by the encryption module 212 to retain confidentiality. Alternatively, the user information may be originally stored in an encrypted format. Programming may be made available on the Internet to websites for downloading code to allow the site to recognize and use the identification code 24 on the card 10. Thus, the encrypted user information may only be viewed by websites having suitable decryption. In this manner, the sensitive nature of the user information may be preserved.

Websites may be enabled to operated in conjunction with the transaction card 10. A website may contain a multimedia module which is downloaded to a user's computer for operating the multimedia module 202. The website may contain further programming which is downloaded to a user's computer to increase the interactivity of the card 10, the user's computer, and the website. As previously stated, the website may further contain an encryption module for decrypting sensitive information received from the transaction card 10. By placing these and other modules on the website, additional space is available on the transaction card 10 for sponsors.

The website may further contain modules for transaction and banking to enable e-commerce and interact with the transaction card 10. Thus, the website and the card 10 form a part of an e-commerce system. A user may log onto a website and, through application of the card 10 to identify a user's account and supplying a PIN number, view a balance in a user's account. The card 10 may incorporate a PIN for security for viewing an account balance and for finalizing a purchase. The user may also view account information relating to payment due dates, minimum payment amounts, overdue interest and so forth. Through additional web programming, payments due could be made with the interactive card. A user may then perform on-line shopping, once again by application of the card 10 to identify the user's account.

The card 10 may also contain programming reflecting a monetary amount, such as a prepaid amount. The monetary amount may be stored in either the magnetic strip 22 or on the optical disk 12. The monetary amount may be used towards purchases at store locations or on-line on the Internet. The monetary amount may be limited to purchases with one or more sponsors, or may be limited to purchases of a certain nature, i.e. sport venues. In this manner, the card 10 may function as a gift certificate as well as a credit card.

In another embodiment, the transaction card 10 may not have a magnetic strip 22. Thus, the transaction card 10 could not function as a conventional magnetic strip card. In such an embodiment, the identification code 24 may only be stored in the identification module 210 on the optical disk 12.

By way of example of operation, a user may receive the transaction card 10 upon purchasing a product. The user may insert the transaction card 10 into a CD ROM drive to enable a multimedia module 202 for instructions on product use. The user may also enable the Internet link module 206 to register the product on line utilizing a code contained in the programming, or other supplied product material, through the Internet. The user may further use the identification code 24 on the transaction card 10 as needed for warranty or other product use as well as crediting or debiting of an account.

The present invention provides a convenient portable card enabling increased opportunities for multimedia applications. A user may use the interactive transaction card for education, reviewing advertisements, Internet use, electronic commerce, personal or demographic information, as well as conventional debit and credit transactions. The transaction card 10 is designed to be interactive with the user and with a host over the Internet. The present invention incorporates familiar computer mediums which have been accepted in commerce.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A dual memory capability transaction card, comprising:
    first data modules stored on a first one of said side of a CD disk and DVD disk having first and second sides that are readable only by a computer with an optical reader;
    combined with second data modules that are stored in magnetic form on a magnetic strip on the second side of said one of a CD disk and DVD disk that are readable by linear insertion into a magnetic card reader medium and read only during slidable linear movement of the disk through the magnetic card reader medium.

2. The transaction card of claim 1 wherein the second data modules comprise at least an identification code.

3. The transaction card of claim 2 wherein the identification code comprises a credit card account number.

4. The transaction card of claim 3 wherein the credit card account number is additionally disposed on a side of the disk to enable visual reading of the account number.

5. The transaction card of claim 1 wherein at least a portion of the first data modules stored on the disk includes encrypted data.

6. The transaction card of claim 1 wherein at least a portion of the first data modules stored on the disk interacts with an encryption module stored exterior of the transaction card.

7. The transaction card of claim 1 wherein the first data modules on the disk include an Internet link module configured to enable connection to a web site.

8. The transaction card of claim 7 wherein the first data modules on the disk include at least a portion of the data stored on the magnetic strip and the Internet link module is further configured to transmit such magnetic strip data to a web site.

9. The transaction card of claim 1 wherein the disk has first and second ends configured in at least a partial radial configuration and first and second opposed parallel chords.

10. The transaction card of claim 1 wherein the disk has a diameter of approximately 80 mm from first to second radial ends.

11. The transaction card of claim 1 further comprising:
    at least a portion of the car user's personal history, other than credit or debit concerns exclusively, stored in at least one of said first data modules.

12. The transaction card of claim 11 wherein said personal history of the card user further includes medical history, transaction history, and driving history.

13. The transaction card of claim 11 wherein said personal history of the card user further includes data for identification or qualification of the user.

14. The transaction card of claim 1 further comprising:
    multimedia data including text, audio, and video stored in at least one of said first data modules.

15. The transaction card of claim 1 further comprising:
    an identification module as one of said first data modules; and
    multiple identification codes stored in said identification module specific to various entities having a relationship with said user.

16. The transaction card of claim 15 wherein:
    said multiple identification codes stored in said identification module represent multiple credit cards thereby eliminating the need for the user carrying more than one credit card.

17. The transaction card of claim 1 wherein at least some of said first data modules interact with at least one of the other first data modules stored on said transaction card.

18. The transaction card of claim 17 further comprising:
at least one logical block of computer instructions contained in one of said first data modules.

19. The transaction disk of claim 1 further comprising:
an optical side of said disk for reading by the computer; and
an opposed side of said disk not readable by the computer.

20. The transaction disk of claim 19 wherein said magnetic strip is disposed on said opposed side of said transaction disk.

21. The transaction disk of claim 19 wherein said magnetic strip is disposed on said optical side of said transaction disk and so located so as not to interfere with the reading of said optical side by said computer.

22. A method for creating a dual memory capability transaction card, comprising:
providing one of a CD disk and a DVD disk having first and second sides for storing data thereon;
storing first data modules on a first side of one of said CD disk and said DVD disk for optical reading only;
disposing a magnetic stripe on the second side of said one of said CD disk and DVD disk;
and storing at least one second data module on said magnetic strip that is readable only with a magnetic card reader medium only during the disk is linearly inserted into and linearly moved through the magnetic card reader medium.

23. The method of claim 22 further comprising storing an identification code as a first data module on the first side of said optical disk.

24. The method of claim 23 wherein the identification code comprises a credit card account number.

25. The method of claim 23 further comprising:
configuring at least one of said first modules to transmit the identification code to a web site.

26. The method of claim 22 further comprising disposing a credit card account number on a side of the optical disk that can be read visually.

27. The method of claim 22 further comprising encrypting a portion of the first data modules stored on the optical disk.

28. The method of claim 22 further comprising configuring one of said first data modules on the optical disk to enable auto-loading and execution of at least some of the other first data modules by a computer.

29. The method of claim 22 further comprising configuring at least one of the first data modules on the optical disk to enable connection to a web site.

30. The method of claim 22 further comprising configuring the optical disk with first and second radial ends and first and second opposed parallel chords.

31. The method of claim 30 wherein the optical disk has a diameter of approximately 80 mm between first and second radial ends.

* * * * *